United States Patent
Amit et al.

(10) Patent No.: US 10,586,049 B2
(45) Date of Patent: Mar. 10, 2020

(54) DETECTION OF SECOND ORDER VULNERABILITIES IN WEB SERVICES

(75) Inventors: Yair Amit, Tel-Aviv (IL); Evgeny Beskrovny, Herzliya (IL); Omer Tripp, Herzliya (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1964 days.

(21) Appl. No.: 13/335,439

(22) Filed: Dec. 22, 2011

(65) Prior Publication Data
US 2013/0167237 A1    Jun. 27, 2013

(51) Int. Cl.
| | |
|---|---|
| H04L 29/06 | (2006.01) |
| G06F 21/57 | (2013.01) |
| H04L 29/08 | (2006.01) |
| G06F 9/30 | (2018.01) |
| G07B 17/00 | (2006.01) |
| H04W 12/00 | (2009.01) |

(52) U.S. Cl.
CPC ........ *G06F 21/577* (2013.01); *H04L 63/1433* (2013.01); *G05B 2219/31085* (2013.01); *G05B 2219/32136* (2013.01); *G06F 9/30058* (2013.01); *G07B 2017/00911* (2013.01); *H04L 67/02* (2013.01); *H04W 12/00514* (2019.01)

(58) Field of Classification Search
CPC .... H04L 63/1433; H04L 67/02; G06F 21/577
See application file for complete search history.

(56) References Cited

U.S. PATENT DOCUMENTS

| | | | |
|---|---|---|---|
| 7,836,303 B2 | 11/2010 | Levy et al. | |
| 7,975,296 B2* | 7/2011 | Apfelbaum et al. | 726/22 |
| 8,281,401 B2* | 10/2012 | Pennington et al. | 726/25 |
| 8,402,525 B1* | 3/2013 | Shah | H04L 41/0273 726/28 |
| 8,646,026 B2* | 2/2014 | Chang | G06F 21/554 726/1 |
| 8,800,042 B2 | 8/2014 | Sima et al. | |
| 2003/0233581 A1* | 12/2003 | Reshef et al. | 713/201 |
| 2007/0094735 A1* | 4/2007 | Cohen et al. | 726/25 |

(Continued)

FOREIGN PATENT DOCUMENTS

WO    2005/077118 A2    8/2005

OTHER PUBLICATIONS

Fong, E., et al., "Web Application Scanners: Definitions and Functions," [online] 40th Hawaii Int'l Conf. on System Sciences, HICSS Jan. 2007, retrieved from the Internet: <www.computer.org/comp/proceedings/hicss/2007/.../27550280b.pdf>, 7 pgs.

(Continued)

*Primary Examiner* — Azizul Choudhury
(74) *Attorney, Agent, or Firm* — Cuenot, Forsythe & Kim, LLC

(57) ABSTRACT

A system for detecting a vulnerability in a Web service can include a processor configured to initiate executable operations including determining whether a Web service uses identity of a requester to select one of a plurality of different paths of a branch in program code of the Web service and, responsive to determining that the Web service does select one of a plurality of different paths of a branch according to identity of the requester, indicating that the Web service has a potential vulnerability.

8 Claims, 3 Drawing Sheets

(56) References Cited

U.S. PATENT DOCUMENTS

| | | | |
|---|---|---|---|
| 2007/0142030 A1* | 6/2007 | Sinha et al. ............. | 455/410 |
| 2008/0178287 A1* | 7/2008 | Akulavenkatavara et al. ............ | |
| | | | 726/22 |
| 2009/0125976 A1 | 5/2009 | Wassermann et al. | |
| 2009/0205047 A1 | 8/2009 | Podjarny | |
| 2010/0169974 A1 | 7/2010 | Calendino et al. | |
| 2010/0186089 A1 | 7/2010 | Fu et al. | |
| 2011/0185433 A1 | 7/2011 | Amarasinghe et al. | |
| 2012/0023377 A1 | 1/2012 | Garskof | |
| 2012/0311712 A1 | 12/2012 | Amit et al. | |
| 2013/0167239 A1 | 6/2013 | Amit et al. | |

OTHER PUBLICATIONS

Me, G., "Exploiting Buffer Overflows Over Bluetooth: The Bluepass Tool," 2nd IFIP Int'l. Cont. on Wireless and Optical Communicaitons Networks, WOCN 2005, Mar. 6-8, 2005, 5 pgs.

Bau, J., et al., "State of the Art: Automated Black-Box Web Application Vulnerability Testing," [online] In Proceedings of IEEE Security and Privacy, May 2010 [retrieved Dec. 16, 2011] retrieved from the Internet: <crypto.stanford.edu/~jcm/papers/pci_oakland10.pdf>, 14 pgs.

"System, Method and Apparatus of the Effective Black-Box Security Testing of the Stateful Web Components," [online] IP.com, [retrieved Dec. 16, 2011] retrieved from the Internet: <http://ip.com/IPCOM/000208558>, 1 pg.

Gerring, T., "Testing Object Permissions with Impersonation," [online] ideaexcursion.com, Oct. 28, 2008, in SQL Server, [retrieved Dec. 16, 2011] retrieved from the Internet: <http://www.ideaexcursion.com/2008/10/28/testing-object-permissions-with-impersonation/>, 4 pgs.

Hautecoeur, F. "Unit Test and Impersonation," [online] MoonWalker, , Jun. 30, 2009 [retrieved Dec. 16, 2011] retrieved from the Internet: <http://geekswithblogs.net/MoonWalker/archive/2009/06/30/unit-test-and-impersonation.aspx>, 4 pgs.

Tonners, J., "Writing Test Code with Impersonation," [online] Microsoft Corporation, MSDN Blogs, Jimmy Tønners Blog, Apr. 14, 2007 [retrieved Dec. 16, 2011] retrieved from the Internet: <http://blogs.msdn.com/b/jimmytr/archive/2007/04/14/writing-test-code-with-impersonation.aspx>, 3 pgs.

U.S. Appl. No. 13/430,002, Non-Final Office Action, dated Jun. 7, 2013, 9 Pg.

U.S. Appl. No. 13/430,002, Final Office Action, dated Dec. 11, 2013, 13 Pg.

U.S. Appl. No. 13/430,002, Non-Final Office Action, dated Aug. 14, 2014, 9 Pg.

* cited by examiner

FIG. 1
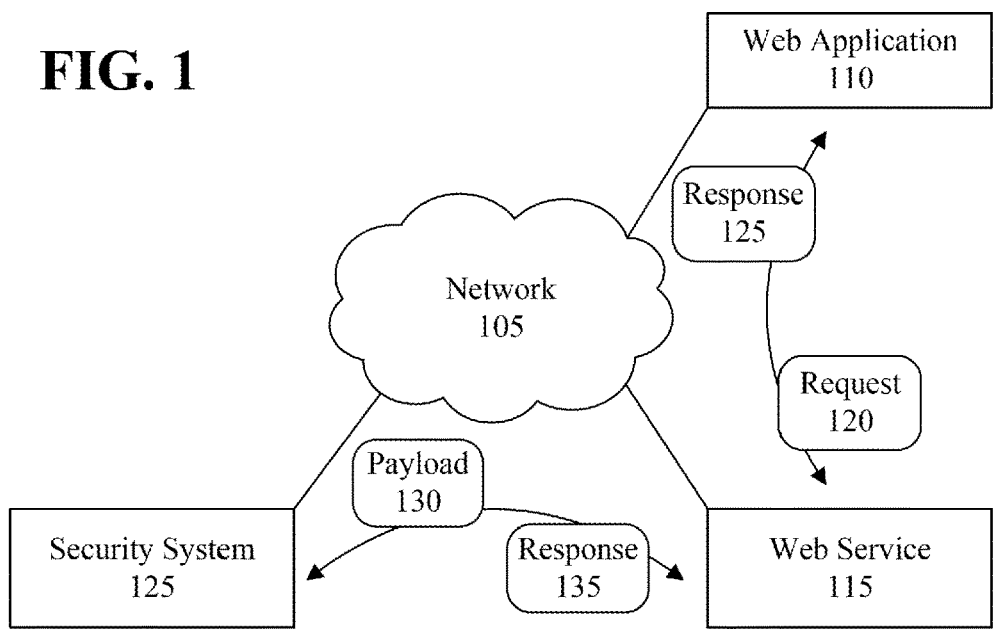
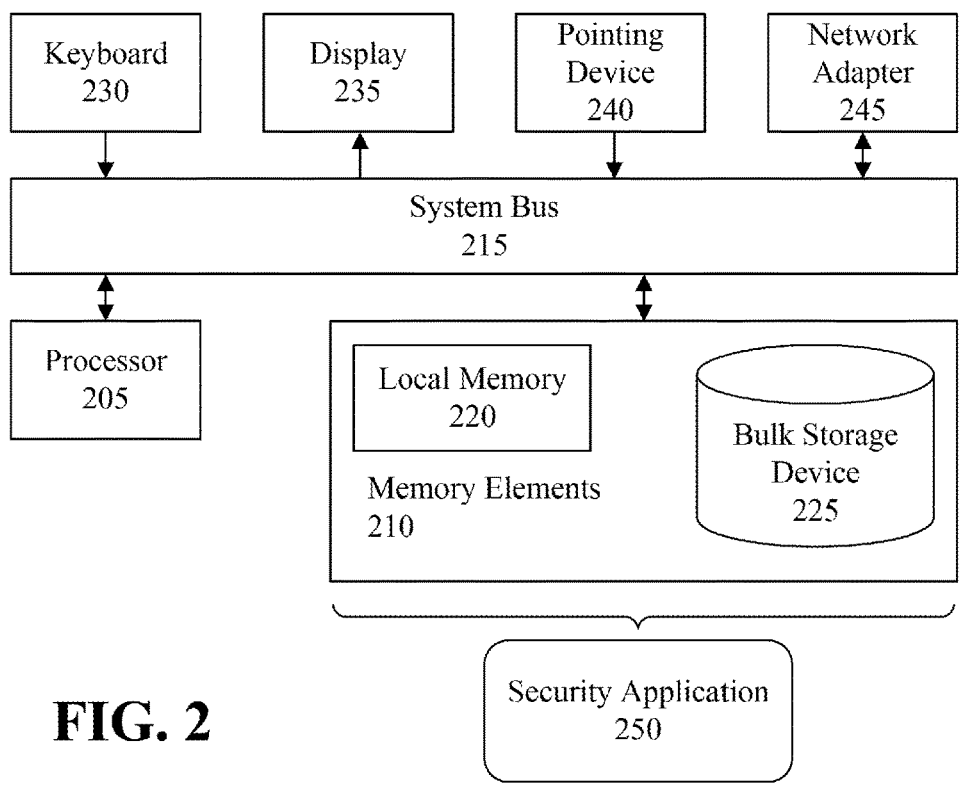
FIG. 2

DETECTION OF SECOND ORDER VULNERABILITIES IN WEB SERVICES

BACKGROUND

One or more embodiments disclosed within this specification relate to Internet security. Business-to-business (B2B) transactions are routinely conducted on the Internet. In many instances, B2B services are initiated by a first Website accessing a service from a second Website as a Web service. One example where this type of arrangement is routinely performed is in the case of online retailers. An online retailer typically relies upon credit and/or debit card processing services from a third party. The credit and/or debit card processing, as performed by the third party, can be provided to the online retailer, e.g., Website of the online retailer, as a Web service.

BRIEF SUMMARY

One or more embodiments disclosed within this specification relate to Internet security and, more particularly, to detecting vulnerabilities within a Web service.

Another embodiment can include a system configured for detecting a vulnerability within a Web service. The system can include a processor configured to initiate one or more of the various executable operations and/or functions described within this specification. The executable operations can include determining whether a Web service uses identity of a requester to select one of a plurality of different paths of a branch in program code of the Web service and responsive to determining that the Web service does select one of a plurality of different paths of a branch according to identity of the requester, indicating that the Web service has a potential vulnerability.

Another embodiment can include a computer program product for detecting a vulnerability in a Web service. The computer program product can include a computer readable storage medium having computer readable program code embodied therewith. The computer readable program code can be configured to perform the various operations and/or functions described within this specification. The computer readable storage medium can include computer readable program code configured to determine whether a Web service uses identity of a requester to select one of a plurality of different paths of a branch in program code of the Web service and computer readable program code configured to, responsive to determining that the Web service does select one of a plurality of different paths of a branch according to identity of the requester, indicate that the Web service has a potential vulnerability.

BRIEF DESCRIPTION OF THE SEVERAL VIEWS OF THE DRAWINGS

FIG. 1 is a block diagram illustrating a system for detecting a vulnerability in a Web service in accordance with an embodiment disclosed within this specification.

FIG. 2 is a block diagram illustrating the security system of FIG. 1 in accordance with another embodiment disclosed within this specification.

DETAILED DESCRIPTION

Figure 3:
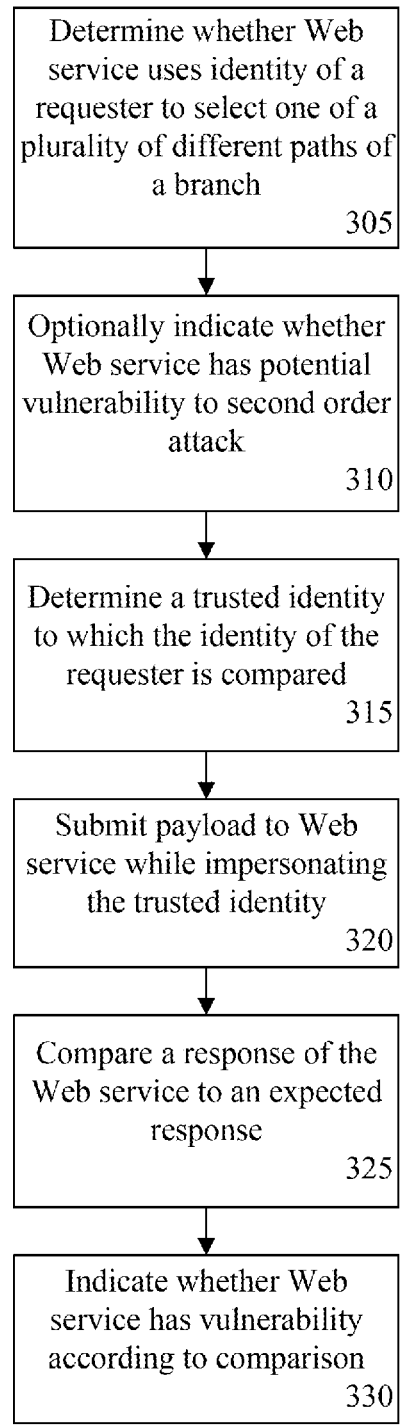
FIG. 3 is a flow chart illustrating a method of detecting a vulnerability in a Web service in accordance with another embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to Internet security and, more particularly, to detecting vulnerabilities in a Web service. In accordance with the inventive arrangements disclosed within this specification, a Web service can be evaluated for one or more vulnerabilities and, for example, for susceptibility to second order attacks. A Web service often is accessed by another, e.g., a primary, Website. As such, the Web service can receive data that originates from both the primary Website and the users of the primary Website. In this regard, the Web service can be vulnerable to attacks initiated from the users of the primary Website as opposed to attacks initiated by the primary Website itself. Attacks initiated by users of the primary Website on the Web service can be referred to as second order attacks. The embodiments disclosed within this specification facilitate the detection of vulnerability to second order attacks, which requires the ability to impersonate trusted entities during testing.

FIG. 1 is a block diagram illustrating a system for detecting a vulnerability in a Web service in accordance with an embodiment disclosed within this specification. As shown, a Web application 110 can interact with a Web service 115 through a network 105. Network 105 can be implemented as any of variety of public and/or private networks including various combinations of such networks. For example, network 105 can be implemented as, or include, the Internet, a LAN, a WAN, one or more wireless networks such as mobile networks or local networks, etc.

Web application 110 can be implemented as a Website that executes on one or more data processing systems, e.g., servers. Web application 110 can be configured to utilize a function and/or service provided by Web service 115. In one example, Web application 110 can be an electronic commerce Website that obtains business-to-business services from Web service 115. As such, Web application 110 can be a registered user of Web service 115.

Web service 115 can be implemented as a Website that executes on one or more data processing systems, e.g., servers. Web service 115 can be configured to respond to requests from registered users which can be other Websites as opposed to end users. For example, Web service 115 can provide functions and/or services to Web application 110, which can be registered with Web service 115. In one example, Web application 110 can be configured to respond only to requests from registered entities and ignore requests received from non-registered entities.

Web application 110, being a registered user of Web service 115, can submit a request 120 to Web service 115. For example, Web application 110 can access Web service 115 through a Simple Object Access Protocol (SOAP) application programming interface (API) that Web service 115 can make available. Request 120 can include a payload, e.g., data, that can originate from Web application 110 and from a source other than Web application 110. For example, Web application 110 can receive input from end users of Web application 110 that is forwarded to Web service 115 as part of the payload in request 120 for processing.

Web service 115 can be configured to verify the identity of the requester, which is Web application 110 in this example. Web service 115 can perform the function requested by Web application 110 and return a response 125 to Web application 110. In some cases, because Web service 115 deals only with registered users, Web application 110 may not perform one or more security functions upon request 120.

Consider an example in which Web application 110 is reputable electronic commerce Website that utilizes Web service 115 for processing credit and/or debit cards. Web application 110 can receive information such as credit card information inclusive of credit card numbers from end users. The credit card information is provided to Web service 115 in request 120 for processing. Web service 115 then provides response 125 to Web application 110 with information indicating whether the transaction was successful.

In some cases, Web service 115 can implement different handling of request 120 based upon the identity of Web application 110. For example, for particular requesters such as Web application 110 deemed trustworthy by Web service 115, Web service 115 may not subject request 120 to the same security checks as would be the case for other Web applications. As such, Web service 115 can be vulnerable to a second order attack perpetrated by way of Web application 110.

For example, a code injection attack, e.g., SQL injection, initiated by an end user of Web application 110 can be inadvertently forwarded to Web service 115 from Web application 110 as part of request 120. In such cases, Web application 110 may not perform security checks, e.g., validation and/or sanitization, or otherwise evaluate data collected from end users since Web application 110 lacks the same level of expertise in evaluating the type of data that is utilized by Web service 115. Similarly, Web service 115 may incorrectly assume that Web application 110 has subjected data received from end users to security checks prior to sending the data to Web service 115 in the form of request 120.

Security system 125 can be configured to test Web service 115 for vulnerability to type of second order attack described above. In one aspect, security system 125 can be configured to evaluate program code of Web service 115 to determine whether Web service implements different treatment or processing of received requests based upon the identity of the requester. Web service 115 further can determine the particular identities that are trusted by Web service 115 and impersonate the trusted entities while submitting a payload 130 to Web service 115. Security system 125 further can compare a response 135 received from Web service 115 in response to payload 130 with an expected response to determine whether Web service exhibits behavior indicating vulnerability to a second order attack.

In some cases, the API of Web service 115 can be specified using Web Service Definition Language (WSDL). The API is exposed to any user. To prevent unwanted access to Web service 115, however, Web service 115 can include one or more authorization layers that accept requests, e.g., calls, only from trusted or registered entities. Having a properly written authorization layer, in some cases, can lead to a false assumption that the input coming from the requester need not be verified and that an attack is unlikely. The second order vulnerabilities described within this specification can arise, at least in part, due to the lack of mutual agreement between Web application 110 and Web service 115 as to which of the two is responsible for examining the payload including user-provided data.

FIG. 2 is a block diagram illustrating security system 125 of FIG. 1 in accordance with another embodiment disclosed within this specification. Like numbers will be used to refer to the same items throughout this specification.

Security system 125 can include at least one processor 205 coupled to memory elements 210 through a system bus 215 or other suitable circuitry. As such, security system 125 can store program code within memory elements 210. Processor 205 can execute the program code accessed from memory elements 210 via system bus 215. In one aspect, for example, security system 125 can be implemented as computer that is suitable for storing and/or executing program code. It should be appreciated, however, that security system 125 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to random access memory or other non-persistent memory device(s) generally used during actual execution of the program code. Bulk storage device(s) 225 can be implemented as a hard drive or other persistent data storage device. Security system 125 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to security system 125. The I/O devices can be coupled to security system 125 either directly or through intervening I/O controllers. One or more network adapters 245 also can be coupled to security system 125 to enable security system 125 to become coupled to other systems, computer systems, remote printers, and/or remote storage devices through intervening private or public networks. Modems, cable modems, and Ethernet cards are examples of different types of network adapters 245 that can be used with security system 125.

As pictured in FIG. 2, memory elements 210 can store a security application 250. Security application 250, being implemented in the form of executable program code, can be executed by security system 125 and, as such, can be considered part of security system 125. In general, security application 250 can be configured to perform a static analysis of program code, instrument program code with diagnostic program code, and perform black box testing of a Web service as described within this specification. It should be appreciated that while security application 250 is illustrated as a single application, security application 250 also can be implemented in the form of two or more applications that can perform the various operations described within this specification and that can be configured to execute cooperatively with one another in performing the operations.

Security system 125 can be configured to output indications as to whether a particular Web service that is being evaluated for security vulnerabilities is susceptible to particular types of attacks, e.g., second order attacks, or is potentially vulnerable to such attacks. As used herein, "outputting" and/or "output" can mean storing in memory elements 210, for example, writing to a file stored in memory elements 210, writing to display 235 or other peripheral output device, playing audible notifications, sending or transmitting to another system, exporting, or the like.

FIG. 3 is a flow chart illustrating a method 300 of detecting a vulnerability in a Web service in accordance with another embodiment disclosed within this specification. Method 300 can be implemented using security system 125 as described with reference to FIGS. 1 and 2 of this specification. Method 300 can begin in a state where a particular Web service has been selected for evaluation for susceptibility to second order attacks.

In step 305, the security system can determine whether the Web service uses identity of a requester to select one of a plurality of different paths of a branch within the program code of the Web service. In step 310, the security system optionally can indicate whether the Web service has a potential vulnerability.

For example, responsive to determining that the Web service does select a particular path at a branch within the program code instead of another available path in the program code predicated upon the identity of the requester, the security system can indicate that the Web service has a potential vulnerability to second order attacks. Thus, in cases where identity of the requester is determinative of the path within the program code that is selected for execution, the security system can determine that the Web service is at least potentially vulnerable to a second order attack. Responsive to determining that the Web service does not select a path of a branch within the program code, e.g., does not branch, according to the identity of the requester, the security system can indicate that the Web service is not susceptible to second order attacks.

Steps 315-330 need only be performed responsive to the security system determining that the Web service does select one path over another based upon identity of the requester. Accordingly, in step 315, the security system can determine one or more trusted identities to which the identity of the requester is compared. For example, the security system can evaluate the comparison that is performed within the program code to determine the particular path to be taken at the branch. The values used to compare with the identity of the requester can be presumed to be values that specify parties or entities considered to be trusted by the Web service.

In step 320, the security system can begin subjecting the Web service to black box testing. The black box testing, however, is performed by impersonating the trusted identity determined in step 315. Accordingly, in step 320, the security system can submit a payload to the Web service while impersonating the trusted identity determined in step 315. For example, the payload can be a simulated type of attack, e.g., SQL injection, that is perpetrated upon the Web service.

In step 325, the security system can compare a response received from the Web service that is provided in response to the payload with an expected response. The expected response can be one that is characteristic of Web service a vulnerability to a second order attack or one that is characteristic of a Web service that is not susceptible to a second order attack.

In step 330, the security system can indicate whether the Web service is vulnerable to second order attacks based upon the comparison performed in step 325. For example, when the response from the Web service is consistent with, or matches, an expected response that is characteristic of a vulnerable Web service, the security system determines that the Web service is vulnerable to second order attacks. Otherwise, the security system indicates that the Web service is not vulnerable to second order attacks. Alternatively, when the response from the Web service is consistent with, or matches, an expected response from a Web service that is not vulnerable to second order attacks, the security system indicates that the Web service is not vulnerable to second order attacks.

Figure 4:
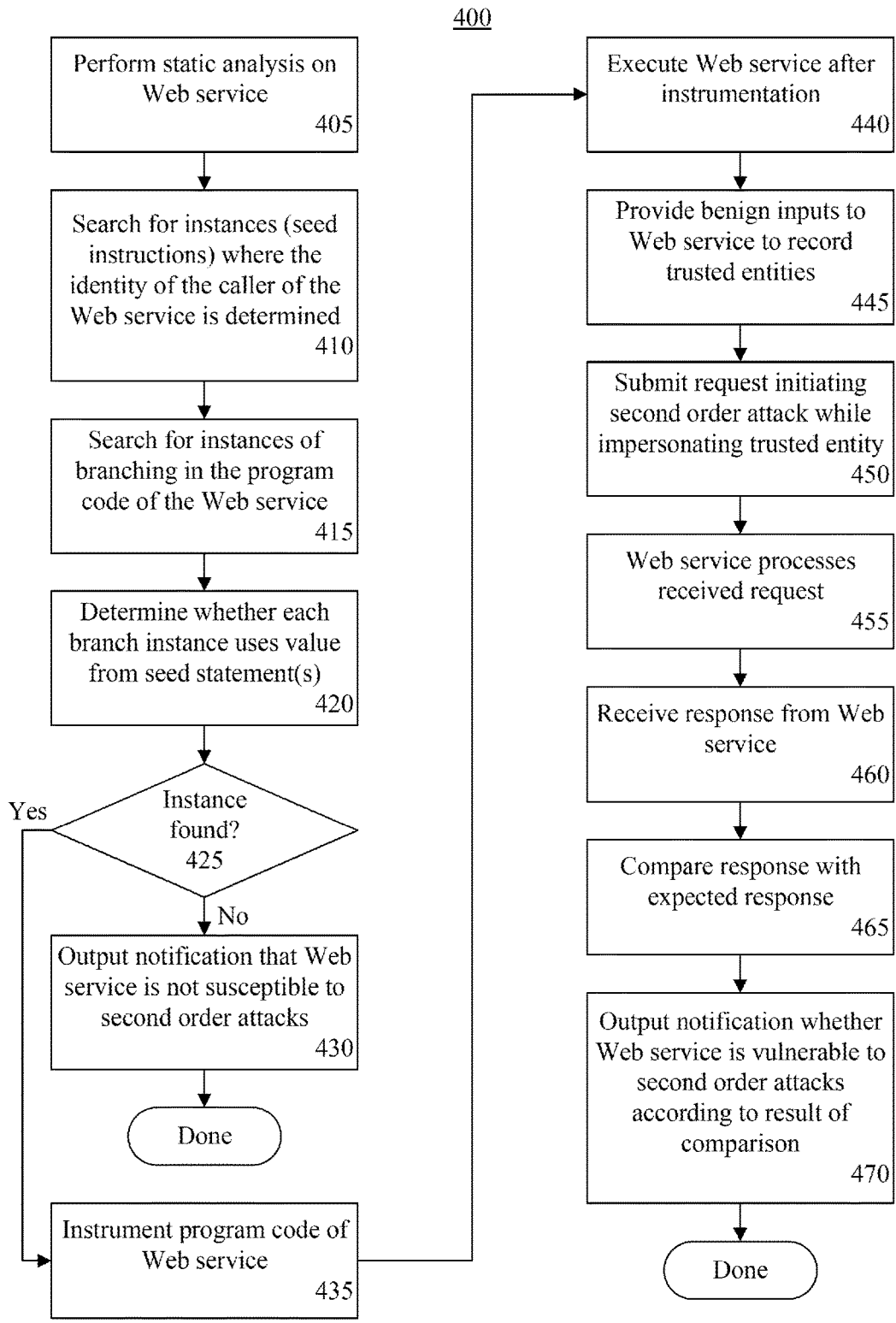
FIG. 4 is a flow chart illustrating a method of detecting a vulnerability in a Web service in accordance with another embodiment disclosed within this specification.

FIG. 4 is a flow chart illustrating a method 400 of detecting a vulnerability in a Web service in accordance with another embodiment disclosed within this specification. FIG. 4 provides an exemplary implementation in which additional detail is provided over that of the embodiment described with reference to FIG. 3. Method 400 can be implemented using security system 125 as described with reference to FIGS. 1-3 of this specification.

Method 400 can begin in a state where a particular Web service has been selected for evaluation for susceptibility to second order attacks. One or more aspects of FIG. 4 can be implemented in a testing environment in which the program code of the Web service is available for static analysis by the security system. In step 405, the security system can perform, or begin to perform, a static analysis upon the Web service. For example, the program code of the Web service can be evaluated by the security system. The program code can be in human readable format, e.g., as source code prior to compilation.

Steps 405-425 can be performed using, or as part of, the static analysis described with reference to step 405, e.g., by the examination of program code of the Web service. It should be appreciated that static analysis is a type of analysis that is performed upon the program code of the Web service while the Web service is not executing. Put another way, static analysis does not require that the Web service be executing, but rather identifies features of the program code itself without execution in order to infer behavior of the Web service when executed.

Accordingly, in step 410, the security system can search for instances within the program code of the Web service in which the identity of the requestor of the Web service is determined or otherwise identified. For example, within an offline testing environment, the security system can search the program code of the Web service for one or more predetermined instructions referred to as "seed" instructions. Each seed instruction can be one that has been determined to be part of a mechanism for conveying identity information from the requester to the Web service.

Within applications, including online or Web services, various standards are often utilized in conveying information. For example, one or more different types of programmatic forms can be used to convey the identity of the requester to the Web service. These mechanisms are generally known and, as such, are known in advance by the security system.

In one example, the security system can search for different seed instructions indicative of, or that implement, these forms. Examples of seed instructions (programmatic structures) that can convey the identity of the requestor and for which the security system can search can include, but are not limited to, SOAP Web Service (WS) Addressing from the header, a X.509 certificate, a Security Assertion Markup Language (SAML) token issued by the trusted Security Token Service (STS), a HyperText Transfer Protocol (HTTP) Referrer header, or the like. New identity forms can be added to a list of those for which the security system searches as such forms become known and available.

In step 415, the security system can search the program code of the Web service to identify any instances of branching located therein. For example, the security system can search for one or more predetermined branching instructions located with the program code of the Web service. In step 420, the security system can determine whether any of the instances of branching in the program code of the Web service located in step 415 utilize a value from the seed statements identified in step 410. A value from the seed statement(s) can be assumed to specify the identity of the requester. Accordingly, any branching instructions that utilize a value from a seed instruction can be determined by the security system to select one path within the program code over another based upon identity of the requester.

In decision block 425, the security system can determine whether at least one instance of branching based upon a value from a seed statement is located. If so, method 400 can proceed to step 430. As noted, when an instance of branching is located that selects one path over another path based upon the value obtained from a seed statement, the security system determines that the Web service is implementing one type of processing, and possibly implementing one level of security, in lieu of another type of processing or level of security, based upon the identity of the requester. When no instance of branching based upon the value from a seed statement is located, the security system can determine that the Web service is not susceptible to second order attacks since no branching is performed based upon the identity of the requester and each requester is subjected to the same level of security. Accordingly, the method 400 can proceed to step 430 where the security system can output a notification that the Web service is not susceptible to second order attacks. It should be appreciated that a determination that the Web service is not vulnerable to second order attacks does not mean that the Web service is not vulnerable to other types of attacks. For example, further black box testing of the Web service can be performed. Such further black box testing, however, need not be performed in a manner that impersonates a trusted entity of the Web service to uncover further security issues.

In step 435, the security system can instrument the program code of the Web service by including one or more different forms or types of diagnostic program code. Instrumentation of program code can be performed in a variety of different ways. For example, source code can be instrumented which requires compilation, or re-compilation of the instrumented program code prior to execution. In another example, machine code, e.g., binary files, can be evaluated and instrumented which does not require compilation or re-compilation as the case may be.

In one aspect, first diagnostic program code can be instrumented within program code of the Web service that locates the branching instances within the program code that perform a comparison of the values determined from the seed instruction(s). The first diagnostic program code further can be configured to record the particular values to which the value from the seed instructions(s) are compared. The values used for purposes of comparison by the Web service are presumed by the security system to be values that represent trusted users of the Web service that have been determined, at least by the Web service, to merit special handling or processing.

In another aspect, the security system can instrument the Web service with diagnostic program code that is configured to defeat particular identity authentication and/or decryption features of the Web service. For example, in the case where the requester uses a certificate or SAML token, both of which may be signed by a Certificate Authority (CA) or an STS, the Web service will include program code that performs a digital signature verification and possibly decryption. Both digital signature verification and decryption are done by using well known platform APIs.

The instrumentation performed by the security system can transform, or modify, the execution flow of the Web service so that procedures to verify the identity of the requester using mechanisms such as digital signatures are bypassed. Further, decryption performed by the Web service also can be bypassed by the diagnostic program code. Bypassing the decryption allows the security system to send plain text SOAP messages to the Web service during a testing phase to simulate, e.g., impersonate, a particular Web application.

In one example, the program code of the Web service can be instrumented using a diagnostic library. Such a library can provide an ability to override an API when implemented in some DLL that is loaded at some point in the process, e.g., during execution. The verification and/or decryption can be overridden in a way that the diagnostic program code returns a "true" value or the like indicating that verification and/or decryption has been performed when, in fact, such mechanisms were bypassed. For example, particular calls by the Web service can be intercepted by the diagnostic program code and values such as "true" or "success" can be returned from the diagnostic program code. Such diagnostic program code can bypass or defeat procedures for identity authentication and/or decryption without modifying the business logic of the Web service itself.

In step 440, the Web service can be executed with the diagnostic program code included therein. In step 445, the security system can provide benign inputs to the Web service in order to exercise, or execute, the portions of the diagnostic program code now within the Web service that record the values used by the Web service to compare with the identity of the requestor. As noted, the values specify the particular entities that the Web service regards as trusted entities. The values, e.g., trusted identities, can be output by the diagnostic program code.

In step 450, the security system can begin black box testing of the Web service while impersonating one of the trusted entities determined in step 445. Accordingly, the Web service again can be executed or can continue to be executed from step 445. In step 450, the security system can submit a request to the Web service having a payload that initiates or simulates a second order attack, e.g., SQL injection, while impersonating a trusted entity. For example, the request can include data indicating that the request is from a trusted entity, e.g., a trusted entity determined in step 445.

In step 455, the Web service processes the received request. As noted, identity authentication and/or decryption can be circumvented during execution of the Web service, which can be executing in a test or offline environment. In step 460, the security system can receive a response from the Web service. In step 465, the security system can compare the received response with an expected response as described with reference to FIG. 3. In step 470, the security system can output an indication of whether the Web service is vulnerable to the second order attack based upon a result of the comparison performed in step 460.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

For purposes of explanation, specific nomenclature is set forth to provide a thorough understanding of the various inventive concepts disclosed herein. The terminology used herein, however, is for the purpose of describing particular embodiments only and is not intended to be limiting. For example, reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The terms "computer program," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/ dynamic load library and/or other sequence of instructions designed for execution on a computer system.

Throughout this specification, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system comprising:
a processor configured to initiate executable operations comprising:
determining whether a Web service uses identity of a requester to select one of a plurality of different paths of a branch in program code of the Web service;
responsive to determining that the Web service does select one of a plurality of different paths of a branch according to identity of the requester, indicating that the Web service has a potential vulnerability;
determining a trusted identity to which identity of the requester is compared; and
submitting a payload to the Web service while impersonating the trusted identity.

2. The system of claim 1, wherein the processor is further configured to initiate executable operations comprising:
defeating identity verification within the Web service; and
defeating identity decryption within the Web service.

3. The system of claim 1, wherein the processor is further configured to initiate executable operations comprising:
comparing a response to the payload from the Web service with an expected response; and
indicating whether the Web service has a vulnerability according to the comparing.

4. A computer program product for detecting a vulnerability in a Web service, the computer program product comprising:
a hardware storage device having computer readable program code embodied therewith, the computer readable program code comprising:
computer readable program code configured to determine whether a Web service uses identity of a requester to select one of a plurality of different paths of a branch in program code of the Web service; and
computer readable program code configured to, responsive to determining that the Web service does select one of a plurality of different paths of a branch according to identity of the requester, indicate that the Web service has a potential vulnerability;
computer readable program code configured to determine a trusted identity to which identity of the requester is compared; and
computer readable program code configured to submit a payload to the Web service while impersonating the trusted identity.

5. The computer program product of claim 4, further comprising:
computer readable program code configured to defeat identity verification within the Web service.

6. The computer program product of claim 4, further comprising:
computer readable program code configured to defeat identity decryption within the Web service.

7. The computer program product of claim 4, further comprising:
computer readable program code configured to compare a response to the payload from the Web service with an expected response; and
computer readable program code configured to indicate whether the Web service has a vulnerability according to the comparing.

8. The computer program product of claim 4, further comprising:
computer readable program code configured to locate a seed instruction in the program code of the Web service in which identity of the requester is determined; and
computer readable program code configured to determine whether a value of the seed instruction that indicates identity of the requestor is determinative in selecting one of the plurality of paths for the branch.

* * * * *